United States Patent [19]

Imai et al.

[11] 4,417,762
[45] Nov. 29, 1983

[54] MOTOR VEHICLE ROOF

[75] Inventors: Eiji Imai; Yoshiharu Michiura, both of Yokohama; Toshio Niihara, Ome, all of Japan

[73] Assignee: Nissan Motor Co., Ltd., Yokohama, Japan

[21] Appl. No.: 277,334

[22] Filed: Jun. 25, 1981

[30] Foreign Application Priority Data

Jul. 4, 1980 [JP] Japan ................................ 55-94477[U]

[51] Int. Cl.³ .............................................. B62D 25/06
[52] U.S. Cl. ...................................... 296/210; 296/213
[58] Field of Search ............... 296/208, 213, 210, 154, 296/203, 187, 185, 211

[56] References Cited

U.S. PATENT DOCUMENTS 2,937,047  5/1960  Hezler, Jr. et al. .................. 296/213
3,894,767  7/1975  Schatzler et al. ..................... 296/213
4,088,366  5/1978  Gallitzendorfer et al. .......... 296/154

FOREIGN PATENT DOCUMENTS 2529375   1/1977  Fed. Rep. of Germany .
2845708   4/1980  Fed. Rep. of Germany .
2916682  10/1980  Fed. Rep. of Germany .
 511210   8/1939  United Kingdom ................ 296/203
2035920   6/1980  United Kingdom .

Primary Examiner—Robert R. Song
Assistant Examiner—Dennis Pedder
Attorney, Agent, or Firm—Thompson, Birch, Gauthier & Samuels

[57] ABSTRACT

A main roof panel of motor vehicle roof is bent to form a longitudinally extending groove on each lateral side of the main roof panel. An outer panel of each roof side rail is arranged to serve as a secondary roof panel which supplements the main roof panel, and is joined at the inner end portion thereof to the underside of the groove of the main roof panel. The joint portion between the outer panel of the roof side rail and the main roof panel is sealed by a sealant outside the groove thereby to provide improved sealing effectiveness.

10 Claims, 7 Drawing Figures

MOTOR VEHICLE ROOF

BACKGROUND OF THE INVENTION

The present invention relates generally to a motor vehicle having a roof construction comprising a main roof panel joined on each side thereof with a secondary roof panel, and more specifically to a joint structure between the main roof panel and the secondary roof panel in such a roof construction.

There have been proposed roof constructions in which an outer panel of a roof side rail disposed on each side of a main roof panel is utilized as a secondary roof panel. In such roof constructions, the outer edge of the main roof panel on each side is joined with the outer panel of the roof side rail. However, structures for such joints hitherto proposed are not satisfactory in the view point of sealing effectiveness.

BRIEF SUMMARY OF THE INVENTION

It is an object of the present invention to provide a motor vehicle having a roof construction comprising a main roof panel joined on each side thereof with a secondary roof panel by a joint structure which is easy to construct but provides satisfactory sealing effectiveness.

According to the present invention, there are provided a main roof panel, and a pair of roof side rails joined with the main roof panel on each lateral side thereof, each of the roof side rails having an outer panel so formed as to form a secondary roof panel which supplements the main roof panel. Each of lateral edges of the main roof panel is so bent as to form a groove extending longitudinally of the vehicle, and the outer panel of each roof side rail has an inner portion which is joined with the underside of the groove of the main roof panel. Preferably a joint portion between the main roof panel and the outer panel of each roof side rail is sealed by a sealant outside the groove. Preferably the groove has a cross section of a U shape, and the inner portion of the outer panel of each roof side rail is so formed that the upper surface of the inner portion abuts on the bottom of the groove of the main roof panel.

DETAILED DESCRIPTION OF THE INVENTION

Figure 1:
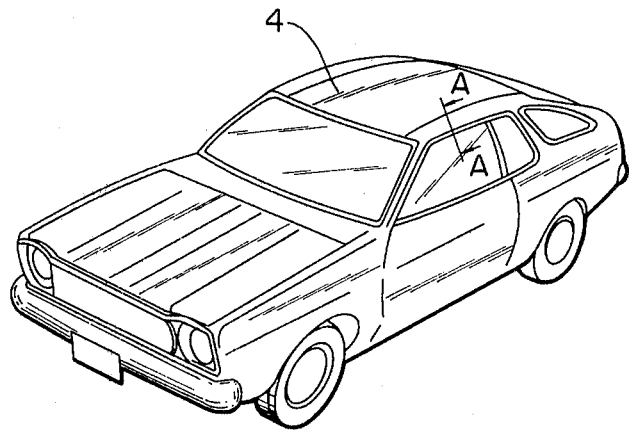
FIG. 1 is a perspective view of a motor vehicle to show portions to which the present invention is applied.
Figure 2:
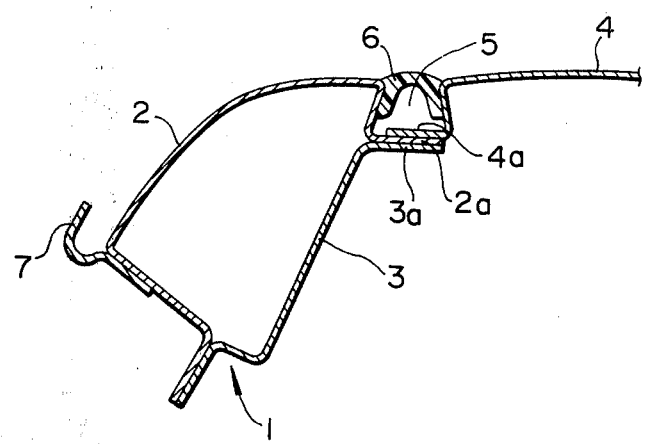
FIGS. 2 and 3 are sectional views taken across A—A of FIG. 1, showing examples of conventional roof structures.
Figure 3:
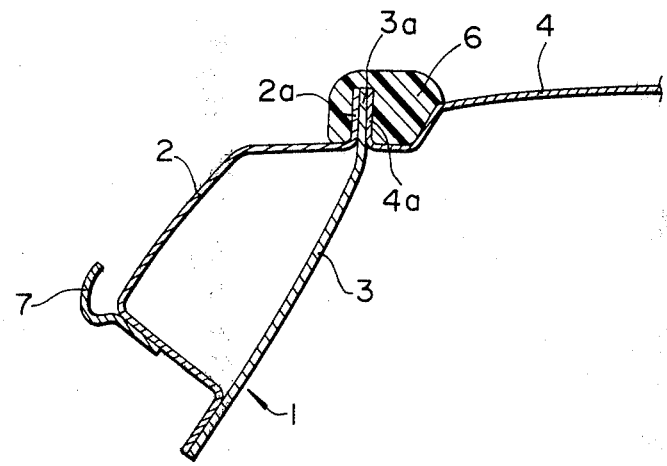

To facilitate understanding the present invention, a reference will be made to conventional roof constructions depicted in FIGS. 2 and 3. There have been proposed roof structures arranged to utilize the outer surface of the roof side rail as a roof panel in order to decrease the weight of the vehicle body. Examples of such roof structures are shown in FIGS. 2 and 3. In FIG. 2, the outside surface of a roof side rail outer portion 2 of a roof side rail 1 is formed as a surface which is a continuation of the contour of a main roof panel 4 so that the roof side rail outer portion 2 serves as a secondary roof panel. Thus, the roof consists of the roof side rail outer portion 2 and the main roof panel 4. For joining the roof side rail outer portion 2 and the main roof panel 4, there are formed, at the roof side rail outer portion 2 and a roof side rail inner portion 3, respectively, horizontal flanges 2a and 3a, at a level lower than the contour of the roof, and a horizontal flange 4a which is formed by downwardly bending the edge portion of the main roof panel 4. The horizontal flange 4a is joined with the flanges 2a and 3a of the roof side rail outer portion 2 and the roof side rail inner portion 3 by spot welding, thus forming a groove 5. A molding 6 is fitted into the groove 5 to veil the groove 5 and the disfigured marks of welding left in the groove. In FIG. 3, there are formed vertical flanges 2a, 3a and 4a, respectively, at each edge portion of the roof side rail outer portion 2, the roof side rail inner portion 3 and the main roof panel 4. These vertical flanges 2a, 3a and 4a are overlapped and welded together by spot welding. A molding 6 is attached on the flanges 2a, 3a and 4a to conceal the joint portion. Reference numeral 7 denotes a drip edge.

In such conventional roof structures, however, there remain problems unsolved. In the roof structure of FIG. 2, sealing must be made at the end of the main roof panel 4. Accordingly, this roof structure can not provide satisfactory sealing effectiveness, and water leakage and rust formation are liable to take place when cracks are made in a sealant by repeated load caused by vibrations during vehicle running. Moreover, the groove 5 must be cut into an intricate dovetail shape in order to fixedly retain the molding 6 in the groove 5. In the roof structure of FIG. 3, the molding 6 is attached on the threefold joint of the flanges 2a, 3a and 4a, so that the surfaces of these flanges must be finished accurately. Besides, the molding 6 is liable to slip upwardly out of place.

Figure 4:
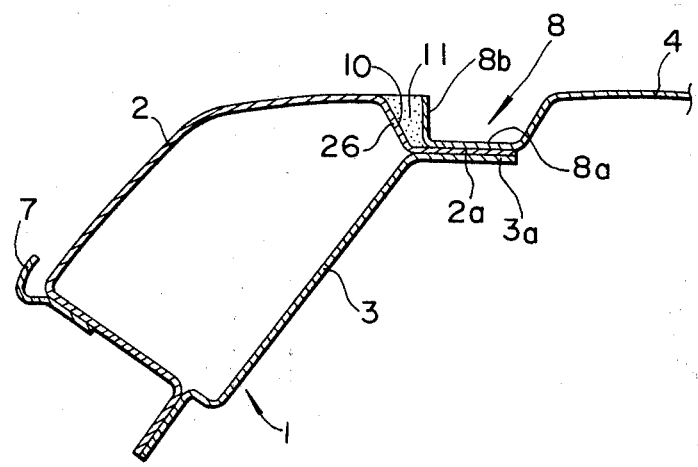
FIGS. 4 to 6 are sectional views taken across A—A of FIG. 1, showing the embodiments of the present invention.

Embodiments of the present invention will be described hereinafter with reference to the attached drawings. In FIG. 4 showing a first embodiment of the present invention, a roof side rail outer panel 2 and a roof side rail inner panel 3 constitute a roof side rail 1. A side end edge portion of a main roof panel 4 is bent downwardly to form integrally a groove 8 generally of a U shape. A bottom 8a of the groove 8 is joined with a flange 2a of the roof side rail outer panel 2 by spot welding. The flange 2a is placed at a lower level by the height of the groove 8 so that the upper surface of the roof side rail outer panel 2 forms a continuation of the contour of the main roof panel 4. There is formed a V-shaped groove 10 between an outer wall 8b of the groove 8 and a slant wall 2b of the roof side rail outer panel 2. The V-shaped groove 10 is filled up with a sealant 11.

In the above-mentioned roof structure, the groove 8 of the main roof panel 4 serves as a gutter for draining off water, and the V-shaped groove 10 located outside the groove 8 is plugged up with the sealant. Therefore, this arrangement leaves no room for water to stay around the joint portion, and thus provides satisfactory sealing effectiveness. Moreover, the outer wall 8b of the groove 8 serves to conceal weld spots on the bottom of the groove 8 from view from the lateral direction of the vehicle. The groove 8 formed along the border of the main roof panel 4 improves the rigidity of the main roof panel 4. Besides, the groove 8 eliminates the necessity of or affords size reduction of the drip edge 7 to be formed at the roof side rail outer panel, and this reduces the air resistance and wind noise such as wind whistle during car running.

Figure 5:
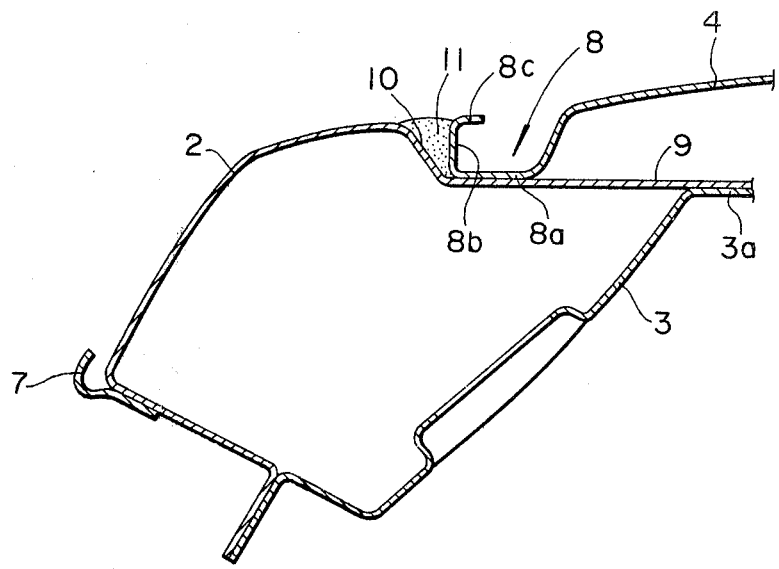

FIG. 5 shows a second embodiment of the present invention which is different from the first embodiment in that the upper edge portion of the outer wall 8b of the groove 8 is bent inwardly to form a substantially horizontal edge 8c. Forming of the horizontal edge 8c makes it more difficult to observe weld spots on the bottom of the groove 8 from the outside than in the case of the first embodiment. Forming the horizontal edge 8c makes it easier to carry out sealing operation in the V-shaped groove 10 located outside of the groove 8, and further improves the rigidity of the main roof panel 4. In this embodiment, the cross section of the roof side rail is enlarged, compared with the first embodiment, to increase rigidity. The flange of the roof side rail outer panel 2 extends to form a relatively long flat portion 9, and the flange 3a of the roof side rail inner panel 3 is welded to the bottom of the inner end portion of the flat portion 9 by spot welding.

Figure 6:
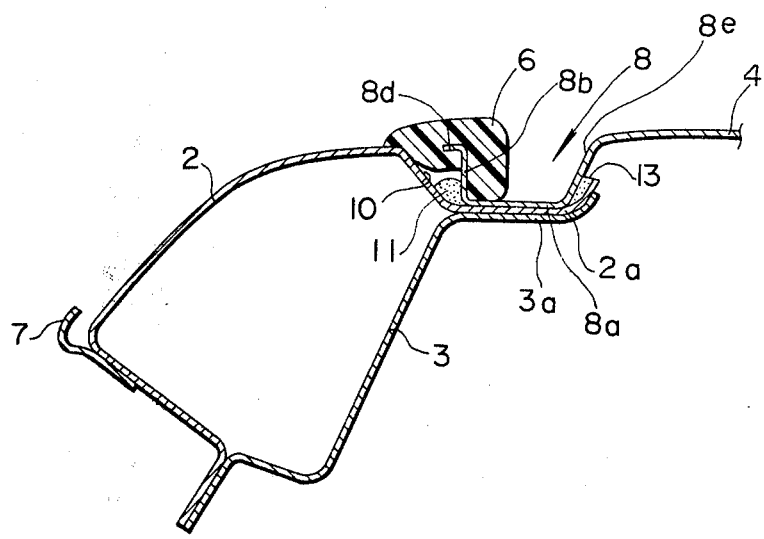

FIG. 6 shows a third embodiment of the present invention in which there is formed, at the upper end of the outer wall 8b of the groove 8, a retaining edge 8d projecting outwardly. The V-shaped groove 10 formed outside the outer wall 8b by the roof side rail outer panel 2 is filled with the sealant 11, and the molding 6 is attached to the outer wall 8b to close the upper opening of the V-shaped groove 10.

Thus, the V-shaped groove 10 is sealed in a twofold manner by the sealant 11 and the molding 6, so that the sealing effectiveness is further improved. The retaining edge 8d formed at the upper end of the outer wall 8b of the groove 8 serves to prevent the molding from slipping off.

In this embodiment, the end portion of the flange 2a of the roof side rail outer panel 2 is bent upwardly along an inner side wall 8e of the groove 8, and a space 13 formed between the inner side wall 8e of the groove 8 and the end portion of the flange 2a is filled with a sealant, thereby to provide further improved sealing effectiveness to the joint portion between the main roof panel 4 and the roof side rail outer panel 2. Unlike the embodiment of FIG. 4, the end portion of the flanges 2a and 3a of the inner and outer panels 2 and 3 are bent upwardly in this embodiment, so that safety of a driver and passengers is improved by protecting their heads from hitting against the edges of the outer and inner panels.

Figure 7:
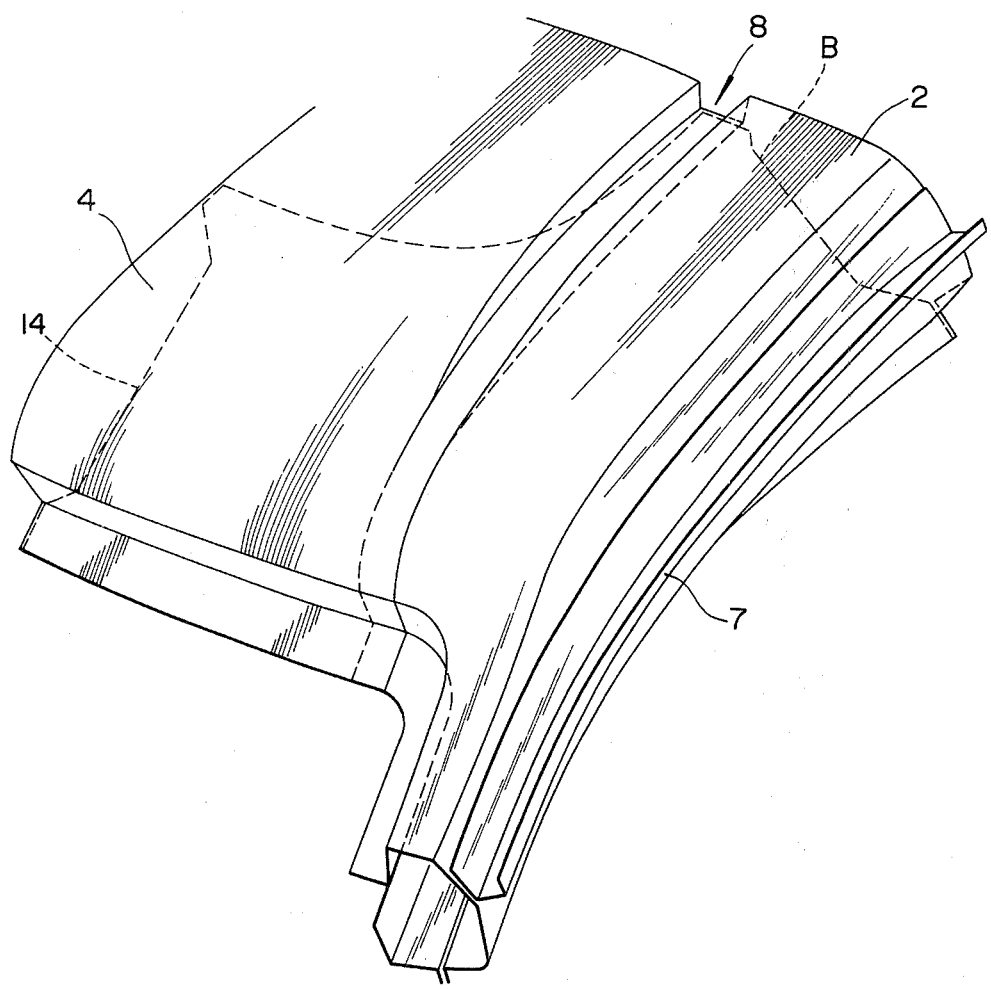
FIG. 7 is a perspective view of the front side of the groove.

FIG. 7 shows, as an example, an arrangement of the groove 8 at the front end portion of the main roof panel 4. As shown in FIG. 7, the groove 8 is so formed that it becomes gradually shallower toward the front. Reference numeral 14 denotes a front pillar inner portion, and the roof side rail inner portion 3 is continuously connected with the rear end B of the front pillar inner portion 14. At the rear end portion of the main roof panel 4, the groove 8 is formed in a similar manner.

What is claimed is:

1. A motor vehicle having a roof construction comprising:
   a main roof panel, each of the lateral sides of said main roof panel being so bent as to form a groove extending longitudinally of the vehicle and having a bottom;
   right and left secondary roof panels lying on each lateral side of said main roof panel, each of said secondary roof panels having an inner portion which is welded to the underside of the bottom of said groove along a weld line extending longitudinally of the vehicle, a ramp portion extending outwardly and upwardly from said inner portion, and a roof portion extending outwardly from said ramp portion as far as an outermost edge of a contour of the roof surface so that the roof surface contour is constituted by said main roof panel and the roof portions of said right and left secondary roof panels, an interspace formed, on each side, between the outer side wall of said groove and said ramp portion of said secondary roof panel, said interspace being filled with a sealant; and
   right and left inner panels each of which is welded to each respective secondary roof panel to form a hollow girder which extends longitudinally of the vehicle under the roof portion of said secondary roof panel.

2. A motor vehicle according to claim 1, wherein the roof portion of each of said secondary roof panels lies over an imaginary flat plane extending between a longitudinal line defining the outermost edge of the roof surface contour and a longitudinal line defining an outer end of the bottom of said groove, and an inner space formed between the roof portion and said imaginary plane is included in said hollow girder.

3. A motor vehicle according to claim 1, wherein said main roof panel and said roof portions of said secondary roof panels are so shaped as to form a generally continuous contour surface of the roof, and said groove is beneath said contour surface.

4. A motor vehicle according to claim 3, wherein an upper end of an outer side wall of said groove is bent inwardly to form an inwardly projecting edge.

5. A motor vehicle according to claim 4, wherein said inner portion of said secondary roof panel inwardly extends beyond said groove, and the cross section of said hollow girder is expanded inwardly.

6. A motor vehicle according to claim 3, wherein an upper end of an outer side wall of said groove is outwardly bent to form an outwardly projecting edge.

7. A motor vehicle according to claims 3, 4 or 6, wherein a molding is attached to said outer side wall of said groove, said molding being so formed as to watertightly cover said interspace.

8. A motor vehicle according to claim 3, wherein an inner end of said inner portion of said secondary roof panel is bent upwardly along an inner side wall of said groove.

9. A motor vehicle according to claim 8, wherein a space formed between said inner side wall of said groove and said inner end of said inner portion of said secondary roof panel is filled with a sealant.

10. A motor vehicle according to claim 3, wherein said groove is so formed that a front and rear end portions of said groove become gradually shallower toward the end to nothing.

* * * * *